US010521525B2

(12) United States Patent
Goyal et al.

(10) Patent No.: US 10,521,525 B2
(45) Date of Patent: Dec. 31, 2019

(54) QUANTIFYING A COMBINED EFFECT OF INTERDEPENDENT UNCERTAIN RESOURCES IN AN ELECTRICAL POWER GRID

(71) Applicant: International Business Machines Corporation, Armonk, NY (US)

(72) Inventors: Aanchal Goyal, White Plains, NY (US); Fook-Luen Heng, Yorktown Heights, NY (US); Younghun Kim, White Plains, NY (US); Tarun Kumar, Mohegan Lake, NY (US); Mark A. Lavin, Katonah, NY (US); Srivats Shukla, Yorktown Heights, NY (US); Wander S. Wadman, Bussum (NL); Kevin Warren, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 447 days.

(21) Appl. No.: 15/412,306

(22) Filed: Jan. 23, 2017

(65) Prior Publication Data
US 2018/0210976 A1 Jul. 26, 2018

(51) Int. Cl.
*G06G 7/54* (2006.01)
*G06F 17/50* (2006.01)

(52) U.S. Cl.
CPC ...... *G06F 17/5009* (2013.01); *G06F 2217/10* (2013.01); *G06F 2217/78* (2013.01); *Y02E 60/76* (2013.01); *Y04S 40/22* (2013.01)

(58) Field of Classification Search
None
See application file for complete search history.

(56) References Cited

U.S. PATENT DOCUMENTS 8,600,572 B2 12/2013 Sri-Jayantha
8,626,353 B2 1/2014 Ghosh et al.
(Continued)

FOREIGN PATENT DOCUMENTS

CN 102801157 A 11/2012

OTHER PUBLICATIONS

Morales, J.M. et al., "A Methodology to Generate Statistically Dependent Wind Speed Scenarios", 2009, Applied Energy 87, Elsevier, Ltd. (Year: 2009).*
(Continued)

*Primary Examiner* — Cedric Johnson
(74) *Attorney, Agent, or Firm* — Cantor Colburn LLP; Grant Johnson

(57) ABSTRACT

Embodiments herein relate to improving a stochastic forecast for uncertain power generations and demands to quantify an effect on an electrical power grid. To improve the stochastic forecast, a method includes fitting marginal distributions to data of the uncertain power generation and demand by power generation and demand nodes of the electrical power grid. The power generation and demand nodes provide corresponding uncertain power generation and demand based on a renewable energy source. The method also includes determining a correlation structure between the power generation and demand nodes by transforming the data from marginal distributions to a second distribution and by fitting a multivariate time series on transformed data. The method also includes simulating multivariate stochastic forecast with an improved correlation structure.

16 Claims, 5 Drawing Sheets

(56) References Cited

U.S. PATENT DOCUMENTS

| | | | |
|---|---|---|---|
| 8,812,165 B1* | 8/2014 | Smith | G01R 19/2513 700/291 |
| 9,148,019 B2 | 9/2015 | Goldsmith | |
| 2010/0332373 A1* | 12/2010 | Crabtree | G06Q 40/04 705/37 |
| 2013/0211988 A1* | 8/2013 | Dorn | G06F 1/26 705/35 |
| 2015/0153714 A1 | 6/2015 | Ho | |
| 2015/0186904 A1 | 7/2015 | Guha et al. | |
| 2015/0295407 A1 | 10/2015 | Hooshmand et al. | |
| 2016/0072289 A1 | 3/2016 | Lazaris | |

OTHER PUBLICATIONS

Barth, R. et al., "Simulation of Short-Term Forecasts of Wind and Load for a Stochastic Scheduling Model", 2011, IEEE. (Year: 2011).*

Pappala, Venkata et al., "Pappala et al A Stochastic Model for the Optimal Operation of a Wind-Thermal Power System", May 2009, IEEE Transactions on Power Systems, vol. 24, No. 2, IEEE. (Year: 2009).*

Haghi, H. et al., "Using Copulas for Analysis of Large Datasets in Renewable Distributed Generation PV and Wind Power Integration in Iran", Feb. 25, 2010, Renewable Energy 35, Elsevier Ltd. (Year: 2010).*

Hagspiel, Simeon et al., "Copula Based Modeling of Stochastic Wind Power in Europe and Implications for the Swiss Power Grid", 2012 Applied Energy 96, Elsevier, Ltd. (Year: 2012).*

Diaz, Guzman et al., "Wind Power Scenario Generation through State Space Specifications for Uncertainty Analysis of Wind Power Plants", Nov. 11, 2015, Applied Energy 162 (2016), Elsevier Ltd. (Year: 2015).*

Goic, R. et al., "Simulation of Aggregate Wind Farm Short Term Production Variations", May 1, 2010, Renewable Energy 35, Elsevier, Ltd. (Year: 2010).*

Yannick Degeilh, et al.; "Stochastic Simulation of Power Systems with Integrated Intermittent Renewable Resources"; Internationl Journal of Electrical Power & Energy Systems, vol. 64, pp. 542-550; 2015.

International Search Report and Written Opinion; International Application No. PCT/IB2018/050310; International Filing Date: Jan. 18, 2018; dated May 5, 2018; 9 pages.

* cited by examiner

QUANTIFYING A COMBINED EFFECT OF INTERDEPENDENT UNCERTAIN RESOURCES IN AN ELECTRICAL POWER GRID

BACKGROUND

The disclosure relates generally to power generation and demand, and more specifically, to quantifying a combined result of interdependent uncertain resources on an electrical power grid.

Power generation can be uncertain due to intensity variations of renewable energy sources (e.g., wind, solar, etc.) that feed an electrical power grid. Power demand can be uncertain due to intensity variations of consumer use (e.g., home electric use, electric vehicles, etc.). Contemporary forecast tools can be used to minimize these uncertainties. However, the contemporary forecast tools merely provide marginal distributions that bound these uncertainties while failing to quantify any interdependence of the power generation and demand at different locations and times in the electrical power grid.

SUMMARY

According to one or more embodiments, a method for improving a stochastic forecast for uncertain power generations and demands to quantify an effect on an electrical power grid. To improve the stochastic forecast, a method includes fitting marginal distributions to data of the uncertain power generation and demand by power generation and demand nodes of the electrical power grid. The power generation and demand nodes provide corresponding uncertain power generation and demand based on a renewable energy source. The method also includes determining a correlation structure between the power generation and demand nodes by transforming the data from marginal distributions to a second distribution and by fitting a multivariate time series on transformed data. The method also includes simulating multivariate stochastic forecast with an improved correlation structure.

According to one or more embodiments, the method for improving a stochastic forecast for uncertain power generations and demands to quantify an effect on an electrical power grid can be implemented as a system and/or computer program product.

According to one or more embodiments, a method is provided. The method comprises collecting, by a processor, past and present forecast data and power generations and demands data associated with at least two power supplying nodes of an electrical power grid to produce a data set; fitting, by the processor, marginal distributions to the data set to produce marginal values; determining, by the processor, a multivariate stochastic forecast that identifies temporal and spatial correlations with the marginal values; simulating, by the processor, a multivariate stochastic forecast; and performing, by the processor, a grid analysis of the electrical power grid based on the multivariate stochastic forecast.

According to one or more embodiments, a method is provided. The method comprises observing, by the processor, power generations and demands by at least two power supplying nodes of an electrical power grid to produce measurement data; forecasting, by a processor, power generations and demands for the at least two power supplying nodes of the electrical power grid to produce forecast data; fitting, by the processor, marginal distributions to the measurement and forecast data; transforming, by the processor, the measurement and forecast data from the marginal distributions to a Gaussian distribution; fitting, by the processor, a multivariate time series to the Gaussian distribution; simulating, by the processor, multivariate time series to produce a sample set; transforming, by the processor, the sample set from the Gaussian distribution to the marginal distributions; and performing, by the processor, a grid analysis of the electrical power grid based on the sample set in the marginal distributions.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
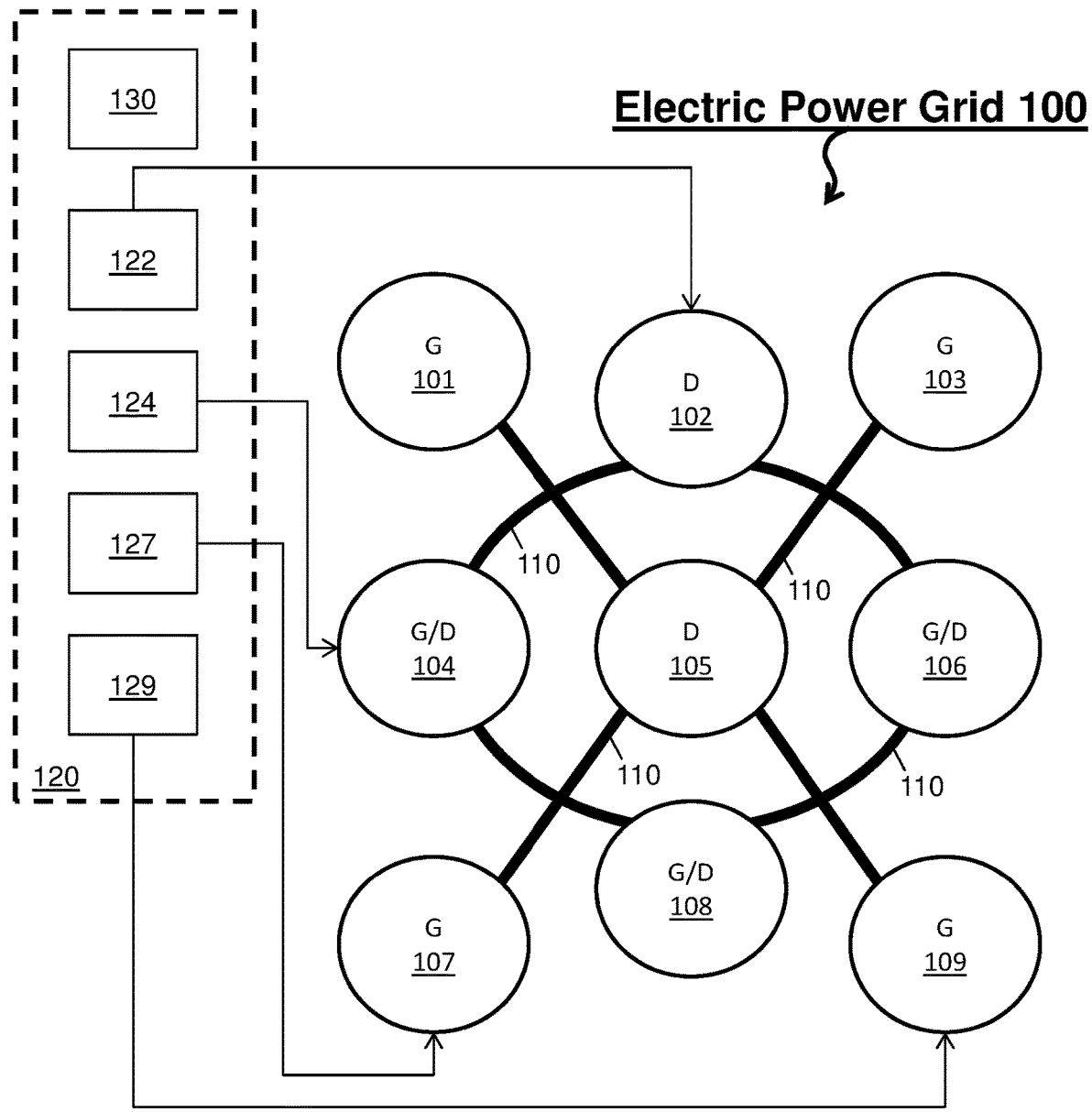
FIG. 1 depicts a schematic of an electrical power grid comprising power generation and/or power demand nodes connected to a correlated sampling system in accordance with one or more embodiments of the invention.

In the U.S. and other countries, an increasing awareness of environmental impact of electricity (power) generation and/or demand, especially by fossil fuels such as coal and oil, has driven an increased interest in utilizing renewable energy sources for electricity generation within an electrical power grid (Note that power generation and/or demand can include power generation, power demand, or a combination of power generation and demand, and is herein referred to as power generation and demand). Renewable energy sources include any fuel source that naturally replenishes on a human time scale, such as sunlight, wind, rain, tides and geothermal heat. Renewable energy sources are notably intermittent and can vary in intensity (e.g., varying wind conditions, intermittency of sunlight, etc.). Electricity generation by renewable energy sources can be uncertain due to the intermittency and intensity variations of these resources, which endangers a stability of the electrical power grid (Note that power demand is also not perfectly predictable, especially given the rise of electronic vehicles). To manage the stability, contemporary forecast tools are being utilized by more and more utility companies to forecast electricity generation uncertainties with respect to renewable energy sources. However, as noted herein, the contemporary forecast tools merely provide marginal distributions forecasts that bound these uncertainties while failing to quantify any interdependence of the power generation and a power demand at different locations and times on the electrical power grid.

Turning now to an overview of aspects of present invention, embodiments disclosed herein may include system, method, and/or computer program product (herein a correlated sampling system) that determines temporal and spatial correlations (interdependences) of stochastic forecasts of uncertain power generation and power demand. For instance, correlated sampling system can implement a data-driven technique (herein referred to as correlated sampling) that estimates spatial and temporal correlations from historical measurements and samples stochastic forecasts that preserve these correlations in addition to the provided marginal distributions. The correlated sampling enables utility companies to perform reliability analyses of electrical power grids with many uncertainties without requiring prior knowledge on their dependence structure.

In a non-limiting operational embodiment, the correlated sampling system utilizes historical forecasting and measurement data as an input to identify correlations between electricity generated by renewable energy sources within an electrical power grid over time (temporally) and among locations (spatially). The correlated sampling system quantifies a joint distribution among these locations and samples realistic forecasting values according to the quantified joint distribution. The samples are then utilized by the correlated sampling system in a grid analysis to improve a forecast accuracy of the electricity generated by the renewable energy sources. In this way, the correlated sampling system provides a data driven approach utilizing the historical forecasting and measurement data to find interdependences that improve forecasts, which reduce or eliminate electricity generation and demand uncertainties to increase the stability of the electrical power grid.

Turning now to FIG. 1, a schematic is depicted of an electrical power grid 100 comprising power generation and/or power demand nodes (e.g., nodes 101-109) connected to a system 120 for estimating temporal and spatial correlations of the nodes in accordance with one or more embodiments of the invention.

The electrical power grid 100 is an interconnected electric power transmission network for delivering electricity from suppliers to consumers. Interconnected electric power transmission network can comprise high-voltage transmission lines and/or distribution lines (represented by thick solid-lines 110) that connect the suppliers and the consumers and carry the electricity. Suppliers can comprise any power station that utilizes a fuel source to generate the electricity (e.g., generate/produce electrical power) for consumption by the consumers within the electrical power grid 100. Consumers can comprise any device and/or facility that demands electricity from the electrical power grid 100 to operate.

As shown in FIG. 1, each of the one or more nodes (e.g., nodes 101-109) can be a power generation node (denoted by a 'G'), a power demand node (denoted by a 'D'), or a power generation and demand node (denoted by a 'G/D'). A power generation node can be a supplier on the electrical power grid 100. Examples of power generation nodes are suppliers that include, but are not limited to, at least one solar panel (a plurality of which can comprise a solar farm), at least one wind turbine (a plurality of which can comprise a wind farm), at least one electric vehicle, and at least one power plant (e.g., hydro-electric, nuclear, fossil fuel, etc.). A power demand node can be a consumer on the electrical power grid 100. Examples of power demand nodes are consumers include, but are not limited to, at least one electronic device, at least one residential property (e.g., a house, a condominium, an apartment building, etc.), at least one commercial property (e.g., a restaurant, a retail store, a datacenter, a factory, an office building, a mall, a skyscraper, etc.), and at least one electric vehicle. A power generation and demand node can be combined supplier and consumer, such as a residential property with solar panels on the roof. In a non-limiting embodiment, the node 101 can represent a fossil fuel power plant, the node 102 can represent a factory, the node 103 can represent another fossil fuel power plant, the node 104 can represent an electric car, the node 105 can represent a datacenter, the node 106 can represent a commercial property that includes multiple solar panels, the node 107 can represent a wind farm, the node 108 can represent a residential neighborhood that includes multiple solar panels, and the node 109 can represent a solar farm.

The system 120 is an example of a correlated sampling system described herein and can include an electronic, computer framework comprising and/or employing any number and combination of processing systems comprising software, hardware, or a combination thereof (e.g., as described with respect to FIG. 5) and networks utilizing various communication technologies, as described herein. The system 120 can comprise one or more forecasting sub-systems, which also can comprise software, hardware, or a combination thereof, that monitor one or more nodes of the electric power grid 100. A forecasting sub-system can be configured to acquire measurement data and generate forecasting data for one or more nodes. In a non-limiting embodiment, the system 120 comprises a forecasting sub-system 122 that monitors with node 102, a forecasting sub-system 124 that monitors with node 104, a forecasting sub-system 127 that monitors with node 107, and a forecasting sub-system 129 that monitors with node 109.

The system 120 can comprise a storage facility 130 that can store the measurement data and the forecasting data (e.g., as historical forecasting and measurement data) with respect to the one or more nodes of the electrical power grid 100. The measurement data can be observational and historical power generation and demand data of the one or more nodes, such as past power generation and demand by the at least two power supplying nodes. The forecasting data can include univariate stochastic forecasts comprising net load and net demand forecasts provided by experts (meteorologists, utilities, etc.), such as forecast data of future uncertain power generation and demand by the at least two power supplying nodes.

In general, the storage facility 130 can include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage facility 130 can be included within the system 120, as shown, or employed in a computer operating system accessed via a network in any one or more of a variety of manners described herein.

Figure 2:
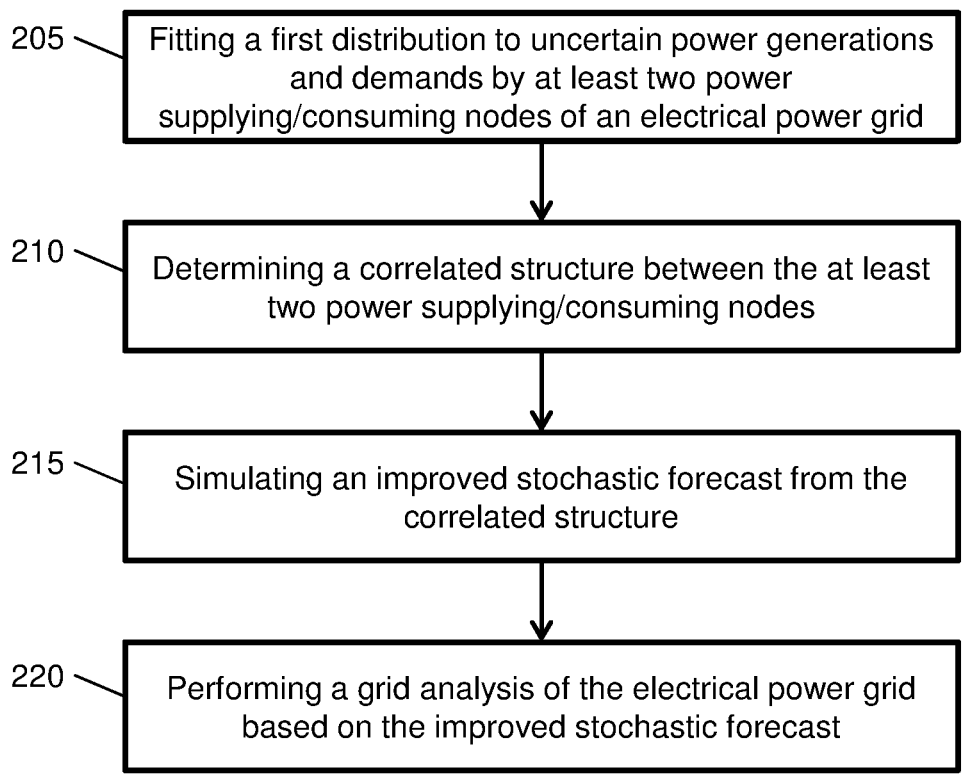
FIG. 2 depicts a process flow of a correlated sampling system in accordance with one or more embodiments of the invention.

Turning now to FIG. 2, an example operation of the correlated sampling system is described in accordance with a non-limiting embodiment. The example operation is depicted as a process flow 200 and is described herein with respect to FIG. 1. Generally, the process flow 200 is a correlated sampling that improves a stochastic forecast by the system 120 for uncertain power generation and demand to quantify an effect on the electrical power grid 100 (e.g., to increase stability of the electrical power grid 100).

The uncertain power generation and demand are provided to the electric power grid 100 by the nodes 104, 108, and 109 based on a renewable energy sources. For instance, the electric car of the node 104 can provide battery power generated and stored stemming from driving and braking operations of the electric vehicle. The wind farm of the node

107 can provide wind power generated by wind. The solar farm of the node 109 can provide solar power generated by sunlight.

The process flow 200 begins at block 205, where marginal distributions are fitted by the system 120 to the uncertain power generation and demand by one or more power generation and consuming nodes (e.g., two or more of the nodes 104, 108, and 109) of the electrical power grid 100. The marginal distributions can be marginal distributions (e.g., of wind, solar, demand, etc.), which can be provided by experts. The marginal distributions can be based on measurement data of past power generation and demand at the at least two power supplying nodes and forecast data of future uncertain power generation and demand at the at least two power supplying nodes (i.e., nodes can be considered locations where connections (cables/lines) intersect/split and the system 120 performs the forecast of supply/demand at that node). The measurement data and the forecast data can be stored as historical forecasting and measurement data by the storage facility 130.

At block 210, the system 120 determines a correlation structure between the one or more power generation and consuming nodes (e.g., power generation and demand nodes). The correlation structure identifies/determines temporal and spatial correlations (interdependences) of stochastic forecasts of suppliers. An example of a temporal correlation includes when a location is sunny at a first timestamp, then it is likely that the location will also have a sunny experience at a second timestamp ten (10) minutes later. An example of a spatial correlation includes when a first location is experiencing a certain wind intensity, then it is likely that a second location that is relatively close to the first location will also experience a similar wind intensity.

To determine the correlation structure, the system can transform the marginal distributions to second distributions and fit a multivariate time series on each second distribution. The second distributions are a Gaussian distribution. In this way, the correlation structure is derived from the parameters of the multivariate time series. Note that the multivariate stochastic forecast can include statistical correlations or multidimensional correlations based on the conditional probability. Note that the multivariate stochastic forecast can also include a linear or nonlinear aggregation of interdependencies of the two or more power generation and demand nodes, At block 215, the system 120 simulates an improved multivariate stochastic forecast, which imposes the correlation structure that is estimated in block 210. For example, the system 120 utilizes the multivariate stochastic forecast to forecast power generation and demand with improved certainty for the two or more of the nodes 104, 108, and 109, despite these nodes providing power generation from renewable energy sources. Note that the simulation of the improved multivariate stochastic forecast from the correlation structure can comprise sampling the multivariate time series and transforming the obtained samples from the second distributions to the marginal distributions.

In addition, the multivariate stochastic forecast can be utilized by the system 120 to aggregate renewable generation from multiple locations to improve the accuracy of an aggregate forecasting, in which the correlation guides the linear or the non-linear aggregation. The system 120 can also tune the linear or the nonlinear aggregation to minimize a combined overshoot or undershoot of a gap between a true generation or demand and the improved multivariate stochastic forecasting to account for an abrupt lack or surplus of power generation and demand. Further, the multivariate stochastic forecast can be utilized by the system 120 to estimate intermittency (of the two or more power generation and demand nodes). The system 120 can define a numerical optimization routine to identify locations where the mutual correlation is minimized to ensure minimal abrupt group behavior. The system 120 can utilize further information to optimize a renewable prospecting where ramp, expected utilization, and other factors can be co-optimized.

At block 220, the system 120 performs a grid analysis of the electrical power grid based on the improved multivariate stochastic forecast. The grid analysis can determine a grid state for each sample, aggregating statistics, and optimizing grid operation.

Figure 3:
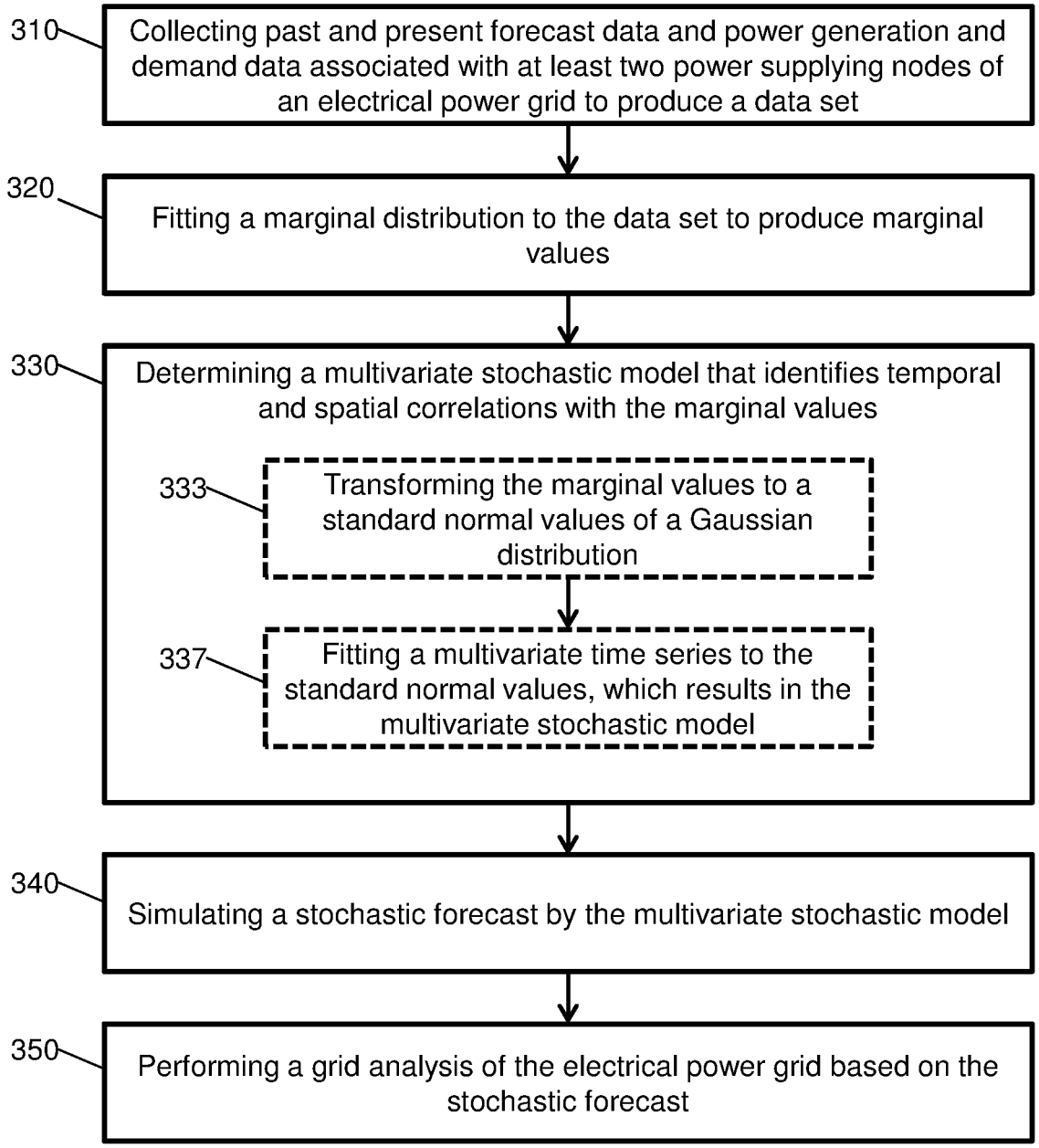
FIG. 3 depicts another process flow of a correlated sampling system in accordance with one or more embodiments of the invention.

Turning now to FIG. 3, another example operation of the correlated sampling system is described in accordance with a non-limiting embodiment. FIG. 3 depicts a process flow 300 that can be executed by a processor of the system 120 to improve a stochastic forecast by the system 120 for uncertain power generation and demand to increase a stability of the electrical power grid 100. The process flow 300 begins at block 310.

At block 310, the processor collects past and present forecast data and power generation and demand data associated with at least two power supplying nodes of an electrical power grid to produce a data set. At block 320, the processor fits marginal distributions to the data set. Note that the marginal distributions can be based on observational data, historical data, and forecast data. Further, the marginal distributions are fitted on a data set at a plurality of time points and a plurality of locations.

At block 330, the processor determines a multivariate stochastic forecast that estimates temporal and spatial correlations from the data set. The multivariate stochastic forecast can be determined based on the operation depicted by dashed blocks 333 and 337. At dashed block 333, the processor transforms the marginal values to values following a standard normal distribution (i.e., a Gaussian distribution with mean zero and unit variance). At dashed block 337, the processor fits a multivariate time series to the standard normal values, which results in the multivariate stochastic forecast. In this way, the transforming of all data from 'marginals' to 'standard Gaussians' and fitting multivariate time series on the standard Gaussians estimates a correlation structure.

At block 340, the processor simulates a stochastic forecast by the multivariate stochastic forecast. Simulating the stochastic forecast can includes sampling a multivariate time series and transforming samples back to 'marginals.' Note that the stochastic forecast is an improved forecast based on the incorporation of the temporal and spatial correlations.

At block 350, the processor performs a grid analysis of the electrical power grid based on the stochastic forecast. The grid analysis can include computing a grid state for each sample (e.g., compute optimal power flow), aggregating statistics (e.g. statistics on power flow, nodal voltages), and optimizing grid operations.

Figure 4:
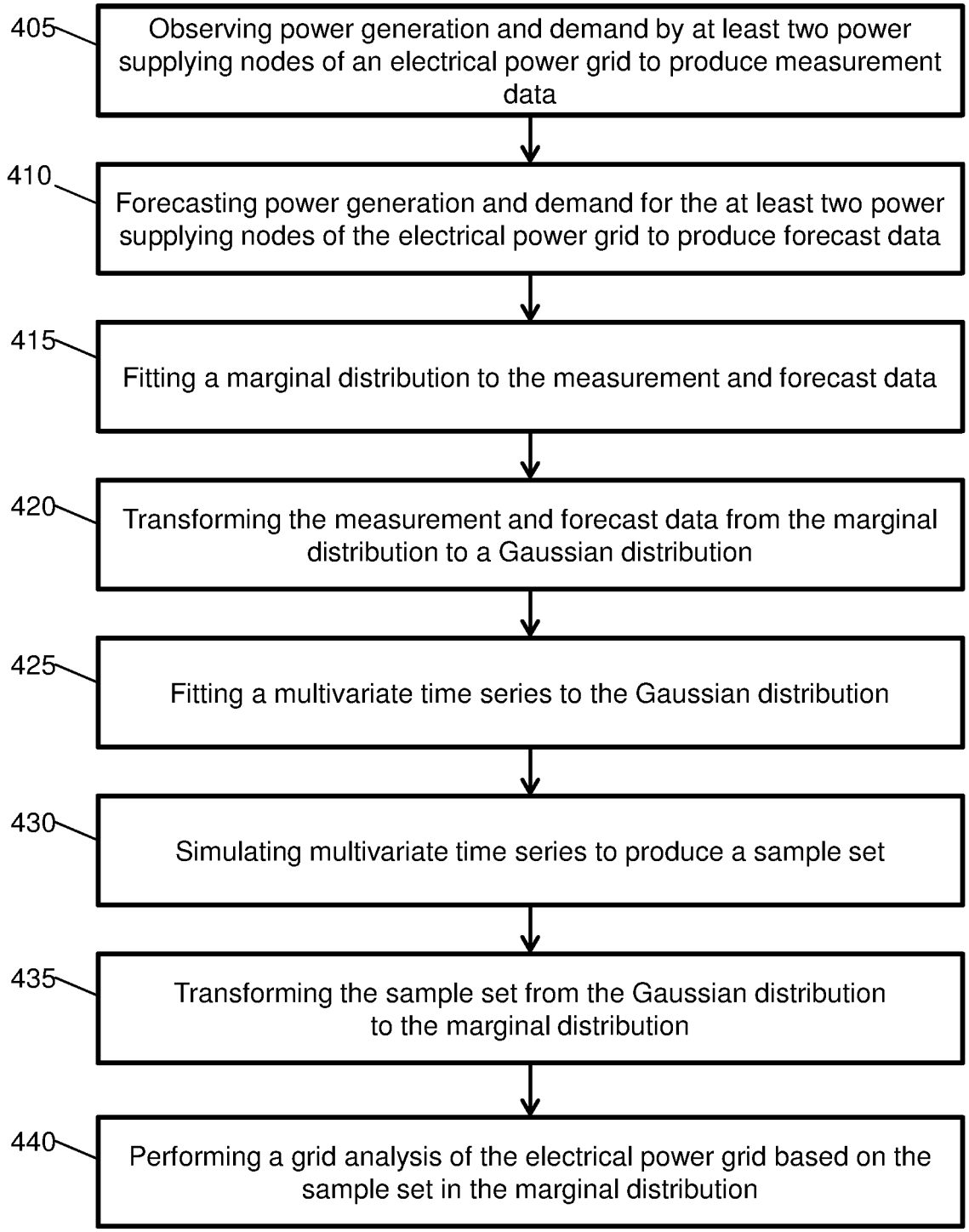
FIG. 4 depicts another process flow of a correlated sampling system in accordance with one or more embodiments of the invention.

Turning now to FIG. 4, another example operation of the correlated sampling is described in accordance with a non-limiting embodiment. FIG. 4 depicts a process flow 400 that can be executed by a processor of the system 120 to achieve the technical effects and benefits of the correlated sampling described herein. The process flow 400 begins at block 405.

At block 405, the processor observes power generation and demand by at least two power supplying nodes of an electrical power grid to produce measurement data. At block 410, the processor forecasts power generation and demand for the at least two power supplying nodes of the electrical power grid to produce forecast data. Note that the measurement and forecast data can be stored on and retrieved from a memory local to the processor. At block 415, the processor fits marginal distributions to the measurement and forecast data.

At blocks 420 and 425, the processor transforms the measurement and forecast data from the marginal distributions to a Gaussian distribution and fits a multivariate time series to the Gaussian distribution. A result of blocks 420 and 425 can be considered a multivariate stochastic forecast for providing multivariate forecasts for the electrical power grid.

At block 430, the processor simulates a multivariate time series to produce a sample set. At block 435, the processor performs the sample set from the Gaussian distribution to the marginal distributions. At block 440, the processor transforms a grid analysis of the electrical power grid based on the sample set in the marginal distributions.

Figure 5:
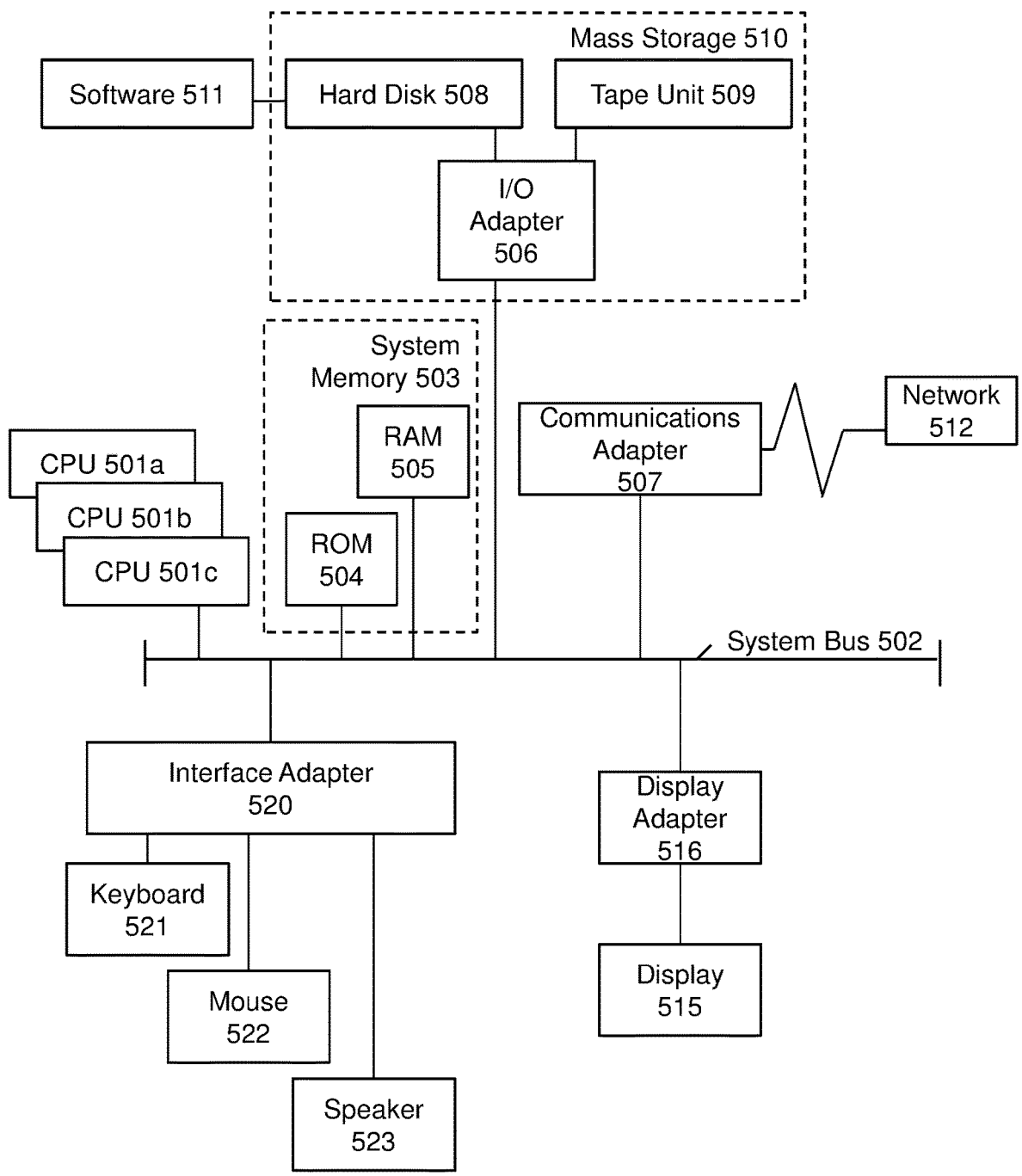
FIG. 5 illustrates a processing system in accordance with an embodiment.

Referring now to FIG. 5, there is shown an embodiment of a processing system 500 for implementing the teachings herein. In this embodiment, the processing system 500 has one or more central processing units (CPU(s)) 501a, 501b, 501c, etc. (collectively or generically referred to as processor(s) 501). The processors 501, also referred to as processing circuits, are coupled via a system bus 502 to system memory 503 and various other components. The system memory 503 can include a read only memory (ROM) 504 and a random access memory (RAM) 505. The ROM 504 is coupled to system bus 502 and may include a basic input/output system (BIOS), which controls certain basic functions of the processing system 500. The RAM is read-write memory coupled to the system bus 502 for use by the processors 501.

FIG. 5 further depicts an input/output (I/O) adapter 506 and a communications adapter 507 coupled to the system bus 502. The I/O adapter 506 may be a small computer system interface (SCSI) adapter that communicates with a hard disk 508 and/or tape unit (tape storage drive) 509 or any other similar component. The I/O adapter 506, the hard disk 508, and the tape unit 509 are collectively referred to herein as a mass storage 510. A software 511 for execution on the processing system 500 may be stored in the mass storage 510. The mass storage 510 is an example of a tangible storage medium readable by the processors 501, where the software 511 is stored as instructions for execution by the processors 501 to perform a method, such as the process flows of FIGS. 2-4. A communications adapter 507 interconnects the system bus 502 with a network 512, which may be an outside network, enabling the processing system 500 to communicate with other such systems. A display (e.g., screen, a display monitor) 515 is connected to the system bus 502 by a display adapter 516, which may include a graphics controller to improve the performance of graphics intensive applications and a video controller. In one embodiment, the adapters 506, 507, and 516 may be connected to one or more I/O buses that are connected to the system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 502 via an interface adapter 520 and the display adapter 516. A keyboard 521, a mouse 522, and a speaker 523 can be interconnected to the system bus 502 via the interface adapter 520, which may include, for example, a Super I/O chip integrating multiple device adapters into a single integrated circuit.

Thus, as configured in FIG. 5, the processing system 500 includes processing capability in the form of the processors 501, and, storage capability including the system memory 503 and the mass storage 510, input means such as the keyboard 521 and the mouse 522, and output capability including the speaker 523 and the display 515. In one embodiment, a portion of the system memory 503 and the mass storage 510 collectively store an operating system, such as the z/OS or AIX operating system from IBM Corporation, to coordinate the functions of the various components shown in FIG. 5.

Technical effects and benefits of correlated sampling by embodiments herein include respecting marginal distributions (of wind, solar, demand, etc.) that are provided by experts (meteorologists, utilities, etc.), when inferring correlations from data. That is, the correlated sampling can utilize data of net load and net demand forecasts to infer correlations, instead of also requiring expert knowledge on those dependencies, as required by contemporary forecast tools. Note that net demand at substations denotes a difference of the demand and power generation that is forecasted at that substation and net load denotes a difference of the load and power generation that is measured at that substation, which can be interpreted as a realization of net demand. After the inference, the correlated sampling can continue by simulating stochastic forecasts of the net demand that preserve the marginal distributions provided by experts and inferred correlations of a correlation structure. In this way, an immediate advantage of using univariate stochastic forecasts as an input to the correlated sampling is that a forecasting at one substation (e.g., a wind farm's output) can be performed completely independent of another forecasting at another substation (e.g., solar farm's output). In this sense, correlated sampling can aggregate multiple univariate stochastic forecasts to a multivariate stochastic forecast in a data-driven fashion. In turn, incorporating a dependency structure of multivariate stochastic forecasts in power grid simulations can avoid underestimating risks of extreme amounts of intermittent generation and demand. Improved risk estimations of excessive total net demand can also help utility companies decide on operational strategies for peak demand management. For example, in an example operation, a correlated sampling can compute confidence intervals of demand aggregated over multiple substations. These confidence intervals can be three (3) times as narrow and/or two (2) times as accurate as the confidence intervals of contemporary forecast tools that omit estimating correlations, which illustrates that samples from correlated sampling are more realistic.

In addition to improving the simulation of generation and demand itself, correlated sampling by embodiments herein can also be applied to statistically estimate any effect on the electric power grid, such as probabilistic (optimal) power flow, as long as a relation between intermittent (renewable energy) sources and a result of interest is observed. Therefore, correlated sampling highly improves an accuracy of reliability analyses of electric power grids with intermittent energy sources. In turn, more accurate reliability assessments enable a higher penetration level of intermittent generation and demand, such as several renewable energy sources and electric vehicle, in the electric power grid, without endangering a reliability of the electric power grid. Thus, embodiments described herein are necessarily rooted in a processor of a system to perform proactive operations to overcome problems specifically arising in the realm of forecasting power generation and power demand.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for improving a stochastic forecast for uncertain power generations and demands to quantify an effect on an electrical power grid, the processor-implemented method comprising:
    fitting, by a processor, marginal distributions to data of the uncertain power generation and demand by two or more power generation and demand nodes of the electrical power grid, each of the two or more power generation and demand nodes providing corresponding uncertain power generation and demand based on a renewable energy source;
    determining, by the processor, a correlation structure between the two or more power generation and demand nodes by transforming the data from marginal distributions to a second distribution and by fitting a multivariate time series on transformed data;
    simulating, by the processor, multivariate stochastic forecast with an improved correlation structure to provide an improved multivariate stochastic forecast; and
    performing, by the processor, a grid analysis of the electrical power grid based on the improved multivariate stochastic forecast, the grid analysis comprising determining a grid state for each sample, aggregating statistics, and optimizing grid operation, wherein the marginal distributions are based on measurement data of past power generations and demands by the two or more power generation and demand nodes and forecast data of future uncertain power generations by the two or more power generation and demand nodes.

2. The method of claim 1, wherein the second distribution is a Gaussian distribution.

3. The method of claim 1, wherein the simulating of the multivariate stochastic forecast with the improved correlation structure comprises sampling the multivariate time series to transform samples from the second distribution to the marginal distributions.

4. The method of claim 1, wherein the correlation structure is utilized to estimate intermittency.

5. The method of claim 1, wherein the correlation structure comprises a linear or a nonlinear aggregation of interdependencies of the two or more power generation and demand nodes.

6. The method of claim 5, wherein the linear or the nonlinear aggregation is tuned to minimize a combined overshoot or undershoot of a gap between a true generation or demand and the improved multivariate stochastic forecasting to account for an abrupt lack or surplus of power generation.

7. A system for improving a stochastic forecast for uncertain power generations and demands to quantify an effect on an electrical power grid, the system comprising the processor and a memory storing program instructions thereon, the program instructions executable by the processor to cause the system to:
    fit marginal distributions to data of the uncertain power generation and demand by two or more power generation and demand nodes of the electrical power grid, each of the two or more power generation and demand nodes providing corresponding uncertain power generation and demand based on a renewable energy source;
    determine a correlation structure between the two or more power generation and demand nodes by transforming the data from marginal distributions to a second distribution and by fitting a multivariate time series on transformed data;
    simulate multivariate stochastic forecast with an improved correlation structure to provide an improved multivariate stochastic forecast; and
    perform a grid analysis of the electrical power grid based on the improved multivariate stochastic forecast, the grid analysis comprising determining a grid state for each sample, aggregating statistics, and optimizing grid operation, wherein the marginal distributions are based on measurement data of past power generations and demands by the two or more power generation and demand nodes and forecast data of future uncertain power generations by the two or more power generation and demand nodes.

8. The system of claim 7, wherein the second distribution is a Gaussian distribution.

9. The system of claim 7, wherein the simulation of the multivariate stochastic forecast with the improved correlation structure comprises sampling the multivariate time series to transform samples from the second distribution to the marginal distributions.

10. The system of claim 7, wherein the correlation structure is utilized to estimate intermittency.

11. The system of claim 7, wherein the correlation structure comprises a linear or a nonlinear aggregation of interdependencies of the two or more power generation and demand nodes.

12. The system of claim 11, wherein the linear or the nonlinear aggregation is tuned to minimize a combined overshoot or undershoot of a gap between a true generation or demand and the improved multivariate stochastic forecasting to account for an abrupt lack or surplus of power generation.

13. A computer program product for improving a stochastic forecast for uncertain power generations and demands to quantify an effect on an electrical power grid, the computer program product comprising a computer readable storage medium having program instructions embodied therewith, the program instructions executable by the processor to cause the processor to:
    fit marginal distributions to data of the uncertain power generation and demand by two or more power generation and demand nodes of the electrical power grid, each of the two or more power generation and demand nodes providing corresponding uncertain power generation and demand based on a renewable energy source;

determine a correlation structure between the two or more power generation and demand nodes by transforming the data from marginal distributions to a second distribution and by fitting a multivariate time series on transformed data;

simulate multivariate stochastic forecast with an improved correlation structure to provide an improved multivariate stochastic forecast; and perform a grid analysis of the electrical power grid based on the improved multivariate stochastic forecast, the grid analysis comprising determining a grid state for each sample, aggregating statistics, and optimizing grid operation, wherein the marginal distributions are based on measurement data of past power generations and demands by the two or more power generation and demand nodes and forecast data of future uncertain power generations by the two or more power generation and demand nodes.

14. The computer program product of claim 13, wherein the second distribution is a Gaussian distribution.

15. A method comprising:

collecting, by a processor, past and present forecast data and power generations and demands data associated with at least two power supplying nodes of an electrical power grid to produce a data set;

fitting, by the processor, marginal distributions to the data set to produce marginal values;

determining, by the processor, a multivariate stochastic forecast that identifies temporal and spatial correlations with the marginal values;

simulating, by the processor, a multivariate stochastic forecast to provide an improved multivariate stochastic forecast;

performing, by the processor, a grid analysis of the electrical power grid based on the improved multivariate stochastic forecast, the grid analysis comprising determining a grid state for each sample, aggregating statistics, and optimizing grid operation, wherein the marginal distributions are based on measurement data of past power generations and demands by the two or more power generation and demand nodes and forecast data of future uncertain power generations by the two or more power generation and demand nodes.

16. A method comprising:

observing, by the processor, power generations and demands by at least two power supplying nodes of an electrical power grid to produce measurement data;

forecasting, by a processor, power generations and demands for the at least two power supplying nodes of the electrical power grid to produce forecast data;

fitting, by the processor, marginal distributions to the measurement and forecast data;

transforming, by the processor, the measurement and forecast data from the marginal distributions to a Gaussian distribution;

fitting, by the processor, a multivariate time series to the Gaussian distribution;

simulating, by the processor, multivariate time series to produce a sample set;

transforming, by the processor, the sample set from the Gaussian distribution to the marginal distributions; and performing, by the processor, a grid analysis of the electrical power grid based on the sample set in the marginal distributions.

* * * * *